US008819046B2

(12) United States Patent
Warren et al.

(10) Patent No.: US 8,819,046 B2
(45) Date of Patent: Aug. 26, 2014

(54) DATA QUERY TRANSLATING INTO MIXED LANGUAGE DATA QUERIES

(75) Inventors: Matthew J. Warren, Redmond, WA (US); Anders Hejlsberg, Seattle, WA (US); Ion Vasilian, Seattle, WA (US); Erik Meijer, Mercer Island, WA (US); Dinesh C. Kulkarni, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1118 days.

(21) Appl. No.: 12/144,630

(22) Filed: Jun. 24, 2008

(65) Prior Publication Data

US 2009/0319496 A1    Dec. 24, 2009

(51) Int. Cl.
*G06F 17/30*    (2006.01)

(52) U.S. Cl.
CPC ............................. *G06F 17/30451* (2013.01)
USPC ........................................................ 707/760

(58) Field of Classification Search
USPC ................................................ 707/759, 760
See application file for complete search history.

(56) References Cited

U.S. PATENT DOCUMENTS

| 5,826,077 | A  | * | 10/1998 | Blakeley et al. ........................ 1/1 |
| 6,381,598 | B1 | * | 4/2002  | Williamowski et al. ........... 704/1 |
| 6,480,848 | B1 | * | 11/2002 | DeKimpe et al. .............. 707/684 |
| 6,560,607 | B1 |   | 5/2003  | Lassesen |
| 6,882,993 | B1 |   | 4/2005  | Lawande et al. |
| 6,898,604 | B1 |   | 5/2005  | Ballinger et al. |
| 7,028,028 | B1 | * | 4/2006  | Balmin et al. ................. 707/760 |
| 7,107,282 | B1 |   | 9/2006  | Yalamanchi |
| 7,164,676 | B1 |   | 1/2007  | Chakraborty |
| 7,246,114 | B2 |   | 7/2007  | Bolognese et al. |
| 7,340,447 | B2 | * | 3/2008  | Ghatare ........................ 707/754 |
| 7,392,259 | B2 | * | 6/2008  | Lee et al. ...................... 715/234 |
| 2001/0054172 | A1 |   | 12/2001 | Tuatini |
| 2004/0030679 | A1 |   | 2/2004  | Gonnet |
| 2004/0073828 | A1 |   | 4/2004  | Bronstein |
| 2004/0193575 | A1 |   | 9/2004  | Chen et al. |
| 2004/0194057 | A1 |   | 9/2004  | Schulte et al. |
| 2004/0194068 | A1 |   | 9/2004  | Warren et al. |

(Continued)

FOREIGN PATENT DOCUMENTS

EP    0378367 A2    7/1990
WO    WO 2007/061430 A1    5/2007

OTHER PUBLICATIONS

U.S. Appl. No. 12/144,634, filed Jun. 24, 2008, Bolognese et al.

(Continued)

*Primary Examiner* — Robert Beausoliel, Jr.
*Assistant Examiner* — Nirav K Khakhar
(74) *Attorney, Agent, or Firm* — Kevin Sullivan; Kate Drakos; Micky Minhas

(57) ABSTRACT

Data source queries may be specified in various languages, such as SQL, XQuery, and object-oriented languages, and each language may have various linguistic features that enable different types of queries. It may be advantageous to formulate mixed language queries having portions specified in a first language and portions specified in a second language, and to provide mixed language query evaluation components that can parse portions of queries of different languages. It may also be advantageous to permit the translation of single language queries into multiple languages to be parsed by such mixed language query evaluation components. Such techniques may permit queries to utilize linguistic features and processing techniques of one language that are less efficient, less direct, or simply unavailable in another language.

20 Claims, 6 Drawing Sheets

(56) References Cited

U.S. PATENT DOCUMENTS

| | | |
|---|---|---|
| 2004/0267760 A1 | 12/2004 | Brundage et al. |
| 2005/0097146 A1 | 5/2005 | Konstantinou et al. |
| 2005/0183071 A1 | 8/2005 | Meijer et al. |
| 2005/0262124 A1 | 11/2005 | Christensen et al. |
| 2006/0053159 A1 | 3/2006 | Aridor et al. |
| 2006/0212418 A1 | 9/2006 | Dettinger et al. |
| 2006/0253430 A1 | 11/2006 | Fernandes et al. |
| 2006/0288047 A1 | 12/2006 | Chron et al. |
| 2007/0006128 A1 | 1/2007 | Chowdhary et al. |
| 2007/0006145 A1 | 1/2007 | Hill et al. |
| 2007/0027849 A1 | 2/2007 | Meijer et al. |
| 2007/0027905 A1 | 2/2007 | Warren et al. |
| 2007/0050348 A1 | 3/2007 | Aharoni et al. |
| 2007/0083807 A1 | 4/2007 | Shaudys et al. |
| 2007/0174763 A1 | 7/2007 | Chang et al. |
| 2007/0219973 A1 | 9/2007 | Cui et al. |
| 2007/0226196 A1 | 9/2007 | Adya et al. |
| 2007/0226203 A1 | 9/2007 | Adya et al. |
| 2007/0271233 A1 | 11/2007 | Hejlsberg et al. |
| 2009/0319497 A1 | 12/2009 | Bolognese et al. |
| 2009/0319498 A1 | 12/2009 | Zabokritski et al. |
| 2009/0319499 A1 | 12/2009 | Meijer et al. |
| 2009/0327220 A1 | 12/2009 | Meijer et al. |

OTHER PUBLICATIONS

U.S. Appl. No. 12/144,639, filed Jun. 24, 2008, Zabokritski et al.
U.S. Appl. No. 12/144,670, filed Jun. 24, 2008, Torgersen et al.
U.S. Appl. No. 12/145,523, filed Jun. 25, 2008, Meijer et al.
"Expression Trees in LINQ", Copyright 2007, 1 Page http://msdn2.microsoft.com/en-us/library/bb882636.aspx.
Hall Tim, "Bulk Collection of DML Results", Date: 2006, 5 Pages, http://www.dba-oracle.com/plsql/t_plsql_dml.htm.
Hall Tim, "Bulk Update Operations", Date: 2006, 4 Pages, http://www.dba-oracle.com/plsq/t_plsql_bulk_update.htm.
Hejlsberg et al. "The. NET Standard Query Operators", Copyright: 2006, pp. 1-30 http://download.microsoft.com/download/5/8/6/5868081c-68aa-40de-9a45-a3803d8134b8/standard_query_operators.doc.
Kostoulas, et al., "XML Screamer: An Integrated Approach to High Performance XML Parsing, Validation and Deserialization", Proceedings of the 15$^{th}$ international conference on World Wide Web, Date: May 23-26, 2006, pp. 93-102, Publisher: ACM New York, NY, USA.
Meijer Erik, "LINQ 2.0: Democratizing the Cloud", pp. 1-4 http://2007.xtech.org/public/asset/attachment/184.
Meijer et al., "XLinq: XML Programming Refactored (The Return of the Monoids)", 18 Pages, http://research.microsoft.com/~emeijer/Papers/XMLRefactored.html.
"Oracle PL/SQL Programming Guide to Oracle 8i Features", 6 pages, http://www.unix.org.ua/orelly/oracle/guide8i/ch05_02.htm.
"Source and Target Operators", 34 Pages http://download.oracle.com/docs/cd/B31080_01/doc/owb.102/b28223/ref_src_tqt_opers.htm#i1175826.
"XQuery Operators", Copyright: 2005-2007, 6 Pages http://www.xquery.com/tutorials/guided-tour/xquery-operators.html.
Box, et al. "The LINQ Project .NET Language Integrated Query", Date: May 2006, 31 Pages.
Champion Michael "NET Language-Integrated Query for XML Data", Date: Feb. 2007, pp. 1-27, http://msdn2.microsoft.com/en-us/library/bb308960.aspx.
Meijer, et al. "Visual Studio Developer Center", Date: Feb. 2007, pp. 1-7, http://msdn2.microsoft.com/en-us/library/ms364068(VS.80).aspx.

* cited by examiner

| SQL QUERY | QUERY RESULT |
|---|---|
| 22 — select title from books where year = 2003; | Quantum Mechanics |
| | Bordeaux Wine Guide |
| 24 — select count(name) from topics where category = 'Science'; | 2 |
| 26 — select LastName from Authors, Books where BookID = PrimaryAuthor order by LastName asc; | Adams |
| | Chen |
| | Simmons |
| | Smith |

FIG. 2

| OBJECT-ORIENTED QUERY | QUERY PROPERTY | QUERY RESULT |
|---|---|---|
| DataSet ds = new DataSet(database); ds.Tables("Books").RowFilter = "year = 2003"; | ds.Tables("Books").Rows("Titles") | Quantum Mechanics |
| | | Bordeaux Wine Guide |
| DataSet ds = new DataSet(database); ds.Tables("Topics").RowFilter = "Category = 'Science'"; | ds.Tables("Topics").Rows.Count | 2 |
| DataSet ds = new DataSet(database); ds.Tables("Books").RowFilter = "AuthorID in [Books].PrimaryAuthor"; ds.Tables("Books").Rows.Sort("LastName"); | ds.Tables("Authors").Rows("LastName") | Adams |
| | | Chen |
| | | Simmons |
| | | Smith |

FIG. 3

| XQUERY | QUERY RESULT |
|---|---|
| 42 — doc("Books.xml")/books[year=2003]/Title | Quantum Mechanics |
| | Bordeaux Wine Guide |
| 44 — count(doc("Books.xml")/topics[category="Science"]) | 2 |
| 46 — for $author in doc("Books.xml") where some $book in doc("Books.xml") satisfies ($book/PrimaryAuthor = $author/AuthorID) return $author/LastName sortby $author/LastName | Adams |
| | Chen |
| | Simmons |
| | Smith |

FIG. 4

DATA QUERY TRANSLATING INTO MIXED LANGUAGE DATA QUERIES

BACKGROUND

The development of various types of data sources, and various types of systems and databases for managing and storing such data sources, has led to the development of mechanisms for querying the data contained therein. Such querying often involves specifying a subset of data to be accessed from the data source, or for updating the data source in various ways, such as inserting new data and modifying the schema of the data source. The queries are often handled by a query evaluating system, which evaluates the query to determine the actions to be taken, applies the evaluated query against one or more data sources, and returns the results of the applied query to the client.

Many languages have been developed for specifying the details of a query to be applied against a data source. A query evaluation system is ordinarily configured to evaluate the query according to the query language, and, upon failing to evaluate the query according to the query language, to return an error message indicating the syntactic or lexical problem with the query. Some systems are also available for evaluating a query in any of several languages, and even a query having a first portion in a first language and a second portion in a second language.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

The development of a wide variety of query languages has led to many types of operations that may be applied against a database. However, each language may natively support a subset of such operations, while supporting some other operations only through indirect manipulation, and not supporting others at all. Even where such languages support such functionalities, the support for a feature in one language may be less robust, efficient, reliable, or convenient than the support for a feature in another language. For example, a language may provide many sophisticated grammatical constructs for selecting data returned by a query (e.g., with native set theory operators, such as UNION, INTERSECT, MINUS, etc.), but may provide few grammatical constructs for sorting data in sophisticated ways. Another language may permit highly structured access to returned data (e.g., by formatting the data in a well-defined hierarchical manner, such as by the Document Object Model), but may not support cross-data-source queries in a convenient manner.

Because no language may be capable of supporting all of the operations that may be desired against a data source and in a suitably efficient and usable manner, a query limited to the constraints of a particular language may provide only a limited set of options for querying a data source. It may be more efficient to specify portions of the query into a second language in which the portion may be more readily specified. This may be advantageous, e.g., where the logic al operations encoded in a portion of the query cannot be specified in the query language, or are more efficiently specified in the second language than in the query language. In these scenarios, a developer may rewrite the query to specify this portion of the query portion in the second language, a mixed language query for delivery to a query processor, but in many scenarios this may not be easily achieved, e.g., where an application involves a large number of such queries, or where the source code is unavailable.

An alternative solution may involve an automated translation of the query into a mixed language query, where a first portion is translated into the query language, and where the second portion is translated into the second language. The separately translated portions may be combined to produce a mixed language query, which may then be sent to the query processor for evaluation as a mixed language query. This automated generation may provide the advantages of a mixed language query, despite the single-language encoding of the query by the developer in the first language, and without a re-coding of the query by the developer as a mixed language query.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DESCRIPTION OF THE DRAWINGS

FIG. 2 is a table of exemplary SQL queries that may be applied to the exemplary relational database of FIG. 1.

FIG. 3 is a table of exemplary object-oriented language queries that may be applied to the exemplary relational database of FIG. 1.

FIG. 4 is a table of exemplary XQuery queries that may be applied to the exemplary relational database of FIG. 1.

DETAILED DESCRIPTION

Figure 1:
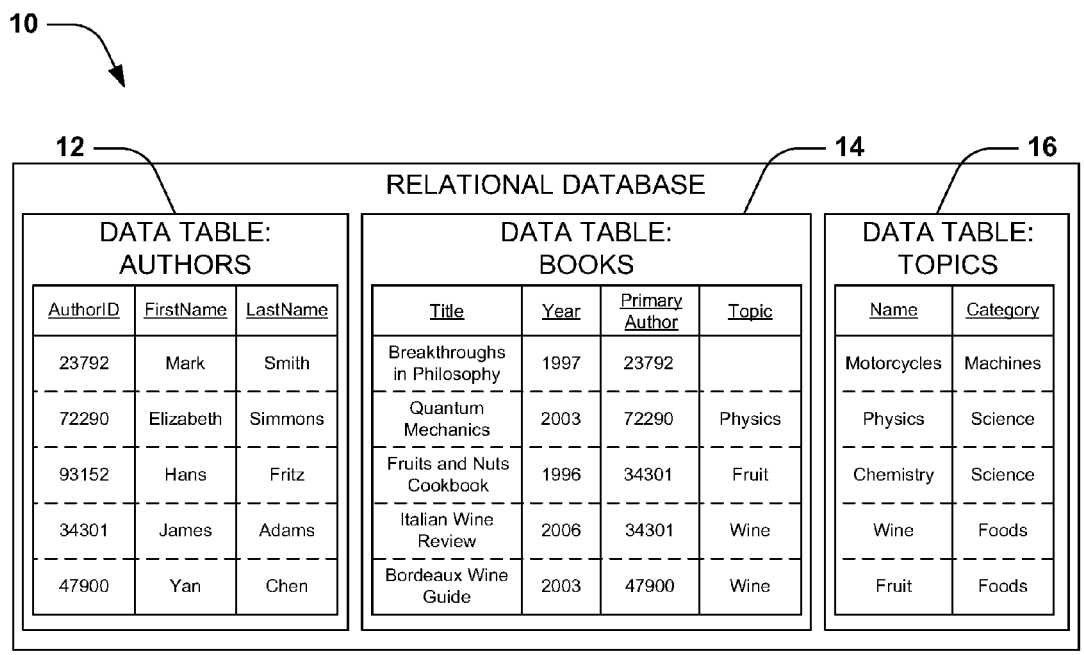
FIG. 1 is an example of a small relational database.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

This disclosure relates to the accessing of data sourced in a data source through the use of a query. Typically, a query is specified against a data source according to a language, which specifies the types of operations to be performed on the data source and the types of data to which the operations are to be applied.

One widely supported language among today's data sources is the Structured Query Language (SQL), which exists in many variations with a shared set of commonalities. SQL generally operates on relational databases, and permits operations for retrieving certain kinds of data from one or more data tables stored in one or more relational databases (a SELECT operation), for inserting records into such data tables (an INSERT operation), for changing data already existing in such data tables (an UPDATE operation), for removing records from such data tables (a DELETE operation), and for modifying the schema by which the data is stored (a CREATE operation for creating structures like tables and indices, a DROP operation for deleting such structures, an ALTER table for modifying such structures, etc.) SQL permits the client to specify some criteria for the data to be targeted by the operation, and supports complex logic for identifying particular kinds of data.

While SQL is used in many of the examples presented herein for convenience due to its widespread familiarity, many other languages may be used with the techniques presented herein. As one example, many imperative languages support queries for various data sources. Many such imperative languages are object-oriented, and the data returned by the query may be formatted as a new object (particularly where the data source is an object-oriented database.) In such languages, the mechanisms for querying data sources may also be object-oriented; e.g., a class may be provided for modeling the data components within the data source, such as a DataSet and a DataTable, and may be operated upon by objects of various classes configured to connect to data sources, e.g., a DataConnection class and a DataCommand class for performing various operations on the data sources. As another example, XQuery is a language for querying data formatted according to an XML schema, but in the context of a relational data source. XQuery is a functional language, wherein the syntax is predominantly structured as a series of invocations of functions that perform simple operations on data.

A query of this nature may be provided to a query evaluation component, such as a database management system or a database engine, which attempts to evaluate the query by determining the logical steps that it specifies. Depending on the operation, the application of the query may yield a query application result data set (e.g., some data records, a scalar value, a Boolean value indicating the success or failure of an operation, one or more objects stored in an object-oriented database, etc.), or may yield an empty data set (e.g., if no data was found to match the criteria specified in a SELECT query), or in some instances may not yield a response (e.g., where the query comprises an instruction to the data source, and the data source simply performs the instruction without comment.) The results of the application of the query to one or more data sources may be returned to the client upon completion of the query.

FIGS. 1-4 present some examples of a data source and queries for working with the data source. FIG. 1 presents a small relational database 10 for storing information about books, including information about the authors of the books and the topics covered thereby. The intention of is relational database 10 comprises three tables: a Books table 14, which specifies books by title, year of publication, author, and topic; an Authors table 12, which specifies the names of some authors; and a Topics table 16, which specifies the names of various topics and some categories into which the topics may be grouped. The relational component of this relational database 10 is embodied in the relationships between the tables; e.g., the Books table 14 includes a "PrimaryAuthor" attribute (e.g., a column) related to the Authors table 12, and a "Topic" attribute related to the Topics table 16. The structuring of the relational database 10 in this manner facilitates querying and updating of the data contained therein. The extension of this relational database 10 includes some records for various books, authors, and topics, which may serve as the basis for queries of various languages.

FIGS. 2-4 present some exemplary queries for operating on the relational database 10 of FIG. 1 in various languages (respectively, the languages of SQL, an exemplary object-oriented language, and XQuery.) The examples in each figure perform the same types of queries and retrieve the same types of results; respectively, the queries specify the retrieval of data representing (a) the books published in the year 2003, (b) the names of the topics under the category of "Science," and (c) the names of authors who are listed as the primary author of at least one book in the relational database. However, the queries operate in different contexts and utilize different methodologies.

As one example, the SQL queries in the example query set 20 of FIG. 2 specify each query by indicating the data to be retrieved from the various tables according to some criteria. Such queries follow a typical "select [some kind of data] from [some data source] where [some criteria]" format, in compliance with the constraints of the SQL language. Queries may also be combined to target data based on data stored in other tables and other databases; e.g., in the third SQL query 26, data in the "Authors" table is targeted based on whether or not the author is listed as a primary author for any book in the "Books" table.

As another example, FIG. 3 specifies each query based on the use of some objects to connect to the database, to retrieve the data into a local object, and to manipulate the records in the table according to some criteria. In these object-oriented queries 30, the results of these operations are not directly returned to the client, but are stored in other objects that may be manipulated to access the results of the query. For instance, the first object-oriented query 32 returns the data as a set of records stored in a DataSet object, which the user may utilize by examining the various properties of the object after the performance of the query (in this case, the "Titles" attribute of the "Books" DataTable object modeled in the DataSet object, after manipulating a RowFilter object associated with the table.) It may be appreciated that the syntax in this example may not conform to any particular object-oriented language, but is presented here (with some syntactic and lexical simplifications) merely as an example of a generic object-oriented language to which these techniques may be applied.

As a third example, FIG. 4 illustrates the same queries according to the XQuery language. This language permits some declarative queries that merely state some criteria for the desired data in a data source structured as an XML file. (In this example, it is presumed that the relational database 10 of FIG. 1 is stored as an XML file called "Books.xml".) XQuery is also functionally oriented, such that many forms of data manipulation may be performed as strings of operators to be applied to a set of data in series to produce a desired result. For instance, in the exemplary XQuery queries 40, the second XQuery query 44 indicates (declaratively) that the desired data is stored in the "Books.xml" within the "Topics" portion of the XML hierarchy, and has a category called "Science," and invokes the count( ) function to specify that the returned value should be the numeric count of records matching the declaration.

An examination of the exemplary SQL queries 20, object-oriented queries 30, and XQuery queries 40 may reveal that while all three languages perform the same types of queries against the relational database 10 of FIG. 1 and produce the same results, the logic exhibited by the query is different in each language. For example, the SQL queries 20 rely on a well-developed filtering mechanism; e.g., the where clause of the query may be used to specify that the data from the identified tables should fit some or many specific constraints, e.g., with respect to data in other tables, such as in the third SQL query 26. However, the data returned by the SQL queries 20 is structured simply as values or as a set of records. By contrast, the exemplary object-oriented queries 30 may permit a less robust filtering mechanism that merely permits the user to limit the records contained in each table by some criteria; however, the data exchange mechanism is capable of creating objects of various types for storing the returned data in well-defined objects. As yet another example, the XQuery queries 40 are well-suited to working with data stored in an XML format, which may include more levels of hierarchy than are typically contained in a relational database; however, queries in the XQuery language may be less adept at complex data operations that are supported by SQL and some object-oriented languages, such as atomic transactions.

The various linguistic features of various languages give rise to different sets of capabilities. One language may support a feature that another may not natively support. One language may more directly support a feature than another, such that queries invoking the feature may be plainly and directly accessed in the first language, but may require more complicated syntax or lexical constructs in the other language. One language may also be more heavily oriented for queries of a particular nature than another, such that a query evaluation component may be able to apply a query of the first language against a data source with more efficiency or accuracy than a query of the other language. Accordingly, some queries may be better suited to one language than to another, owing to the different sets of features and operational focus of the various languages.

However, in some cases, a query may be advantageously specified as if invoking various features of multiple languages. For example, a query operating on data stored in an XML format may be specified in an XQuery manner, invoke criteria in an SQL-like manner, and store the results of the query in an object-oriented manner, such as within a DataTable object hosted by a DataSet object. The reliance on features from multiple languages may permit queries to be written with greater clarity, utilizing a broader set of features, and capable of being evaluated and applied in a more efficient manner than similar queries restricted to the constructs and constraints of a single language.

Figure 5:
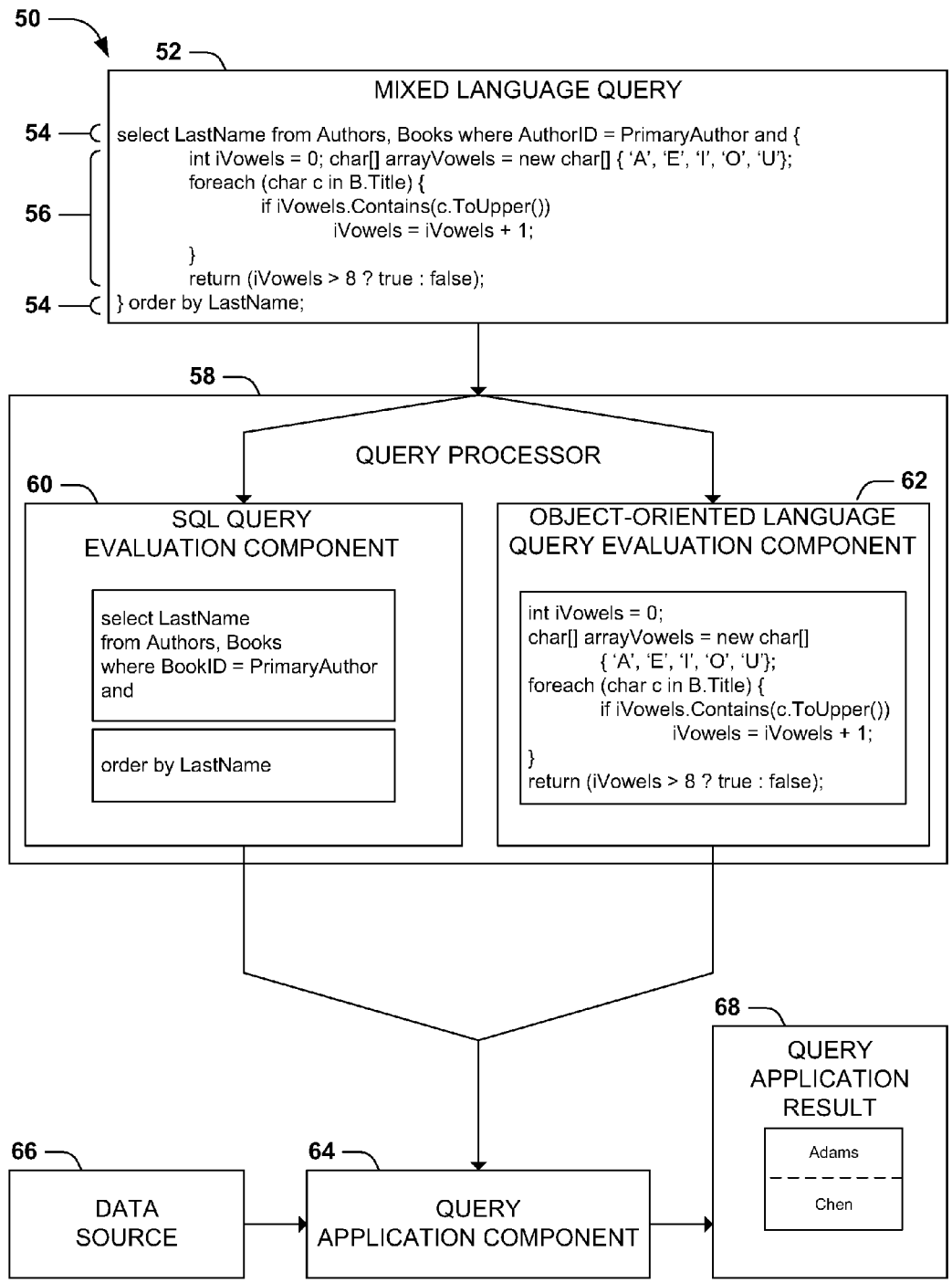
FIG. 5 is a component block diagram illustrating an exemplary processing of a mixed language query.

FIG. 5 illustrates an exemplary scenario 50 involving a mixed language query 52 and its processing through a query processor 58 that is capable of handling such queries. The mixed language query 52 contains a first portion 54 specified in a query language (in this case, SQL) and a second portion 56 specified in a second language (in this case, an object-oriented language), as well as a third portion 58 also specified in the query language. The mixed language query 52 may be submitted to a query processor 58 that can identify the languages in which the portions of the query are specified. The query processor 58 may therefore submit the first portion 54 and the third portion 58 to an SQL query evaluation component 60, and the second portion 56 to an object-oriented language query evaluation component 62, each of which may parse the corresponding portions of the query and identify the logical operations specified thereby. The operations specified thereby may be identified as an evaluated query that may be applied by a query application component 64 to the data source 66 that the query processor 58 manages. The mixed language query 52 might also result in a query application result 68, such as a result data set, which may be returned to the client. In this manner, the mixed language query 52 may be applied to the data source 66 through a mixed language query processor 58, and the various portions of the query may be specified in any suitable language.

The exemplary scenario 50 of FIG. 5 illustrates the enhanced set of operations that may be included in a mixed language query (e.g., the regular syntax of SQL combined with the imperative, sequential processing of instructions of an object-oriented language.) Moreover, the mixed language query may be processed more quickly as a result; e.g., the sorting operation may be more quickly performed in SQL than in the object-oriented language, while the vowel-counting aspect may be more quickly performed in the object-oriented language than in a convoluted set of operations in SQL that might achieve the same result in a more indirect and slower manner. In addition, it may be possible to evaluate the separate portions of the query in parallel, e.g., by evaluating the SQL portion in the SQL query evaluation component 60 while concurrently evaluating the object-oriented portion in the object-oriented language query evaluation component 62. Such concurrency may be achieved, e.g., through a multithreading or multiprocessing architecture of the query processing software, and/or through the use of multiple hardware processors or processor cores for concurrent processing. The formulation of the query in a mixed language manner may facilitate this partitioning, e.g., by partitioning the query into different units that may be processed by different processors.

While the exemplary scenarios of FIGS. 2-5 together illustrate some of the advantages of mixed language queries (e.g., an extended set of logical operations that may be included in a query, and performance advantages that may be derived therefrom), it may be difficult to develop a multiple-language query for several reasons. As a first example, the various languages used in the mixed language query may have different syntactic protocols, different conventions for storing and organizing data, and different sets of supporting libraries of operations. Also, data is often exchanged between the different portions (e.g., text data derived in the SELECT portion through an SQL syntax may be operated upon in the WHERE portion in an object-oriented syntax), and differences in the data conventions of each language may create interface difficulties. Thus, a developer of a mixed language query may have to contend with multiple languages and the exchanging of data therebetween, which may complicate a syntactically and logically correct formulation of the query and subsequent evaluation (e.g., for validation, testing, or debugging.) As a second example, even if the query processor is capable of handling mixed language queries, the development tools applied to the application may not be similarly capable, thereby hampering the development of mixed language queries. As a third example, the conversion of an application that was originally designed with single-language queries may involve the re-coding of a prohibitively large number of queries, and in some cases, the source code may be unavailable to evaluate and re-code the single-language queries.

Thus, while it may be desirable to specify queries as mixed language queries, it may be difficult for developers to formulate or reformulate queries in many scenarios. However, an alternative technique for developing mixed language queries may be applied for automatically formulating queries as mixed language queries, wherein a translation may be applied to produce a query having some portions specified in a query language and other portions specified in a second language. As a first example, a compiler of code involving a query in a source code language may opt to compile some portions of the query into a query language (such as SQL), and to compile other portions of the query into a second language (such as wholly or partially compiled instructions of a programming language.) As a second example, a programming language may permit a language-integrated query specified in a first language, and may be configured to compile the language-integrated query into a query language, but it may be undesirable to perform some portions of the query in the query language, so the compiler may compile these portions into a second language. As a third example, a proxy may be devised that accepts queries and handles the application of the queries to a data source (either on the client side, e.g., as a local proxy for interfacing with a remote data source, or on the server side, e.g., as part of the interface for receiving queries from various clients.) A proxy of this nature may also be configured, e.g., to identify portions of the query that are more desirably performed according to a second language, and may translate such portions into the second language in order to generate a mixed language query. Such automated translators may be configured to identify aspects of the query that are more easily, efficiently, and/or correctly performed if specified as specified according to the second language (e.g., by identifying in the query a common task that is often specified in the query language, but may be more efficiently performed in the second language.) The application of such techniques to queries against a data source may enable an automated translation of portions of the query into the second language, a combining of the differently specified portions of the query into a mixed language query, and the application of the mixed language query to the data source. Thus, some of the advantages of mixed language queries may be achieved in an unobtrusive and automated manner, without involving a coding or re-coding of the queries by one or more developers as mixed language queries.

Figure 6:
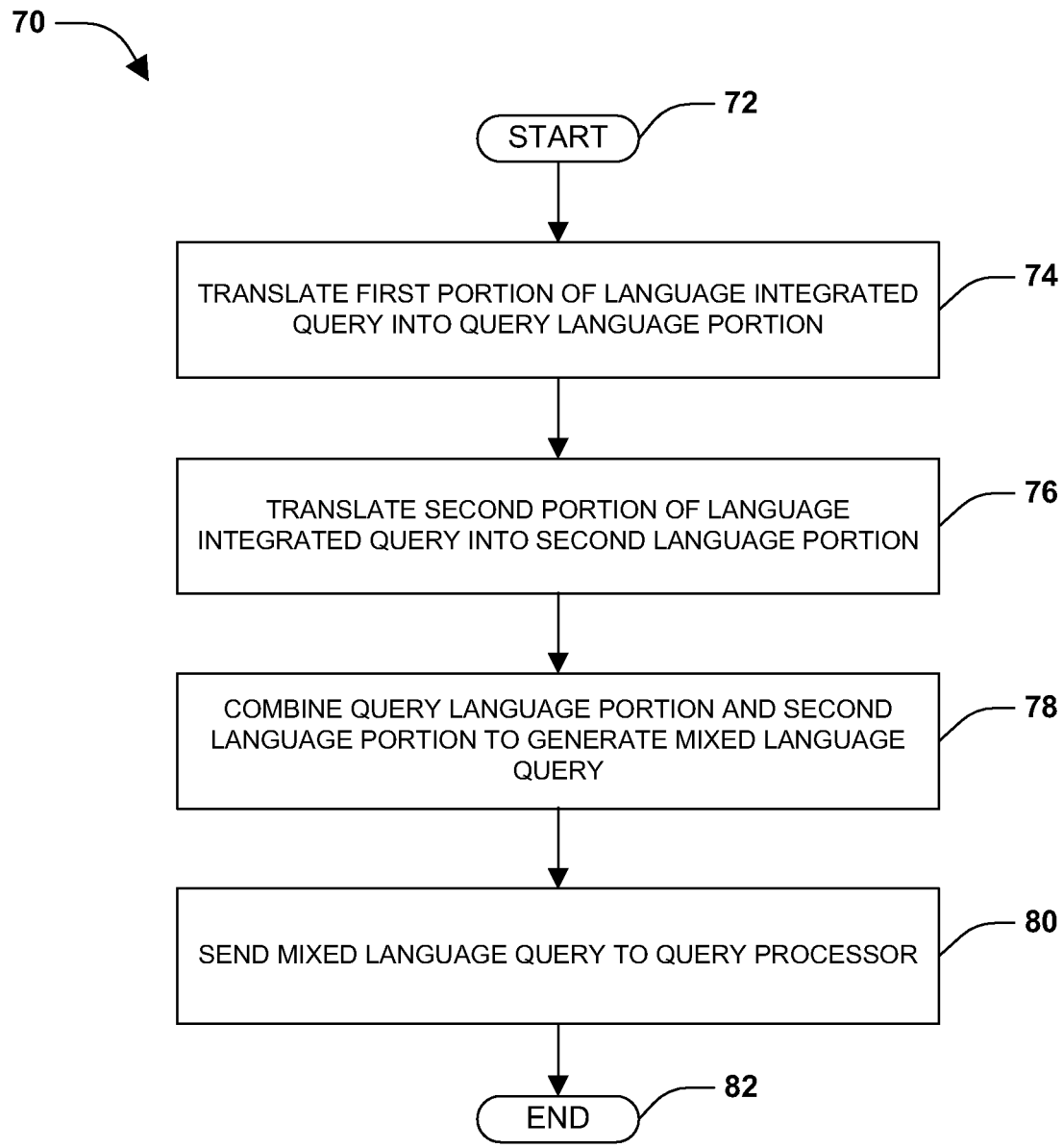
FIG. 6 is a flow diagram illustrating an exemplary method of issuing a language integrated query embedded in a first language to a query processor configured to parse mixed language queries having components of a query language and components of a second language.

FIG. 6 illustrates a first scenario utilizing the techniques discussed herein, formulated as an exemplary method 70 of issuing a language integrated query embedded in a first language to a query processor configured to parse mixed language queries having components of a query language and components of a second language. The exemplary method 70 begins at 72 and involves translating 74 a first portion of the language integrated query into a query language portion. The exemplary method 70 also involves translating 76 a second portion of the language integrated query into the second language portion. The exemplary method 70 also involves combining 78 the query language portion and the second language portion to generate a mixed language query, and sending 80 the mixed language query to the query processor. By automatically translating portions of the query into the query language and the second language, and by sending the combined mixed language query to the query processor, the exemplary method 70 thereby achieves the automated issuing of the query against the data source as a mixed language query without involving (or, perhaps, even notifying) a developer, and so ends at 82.

Figure 7:
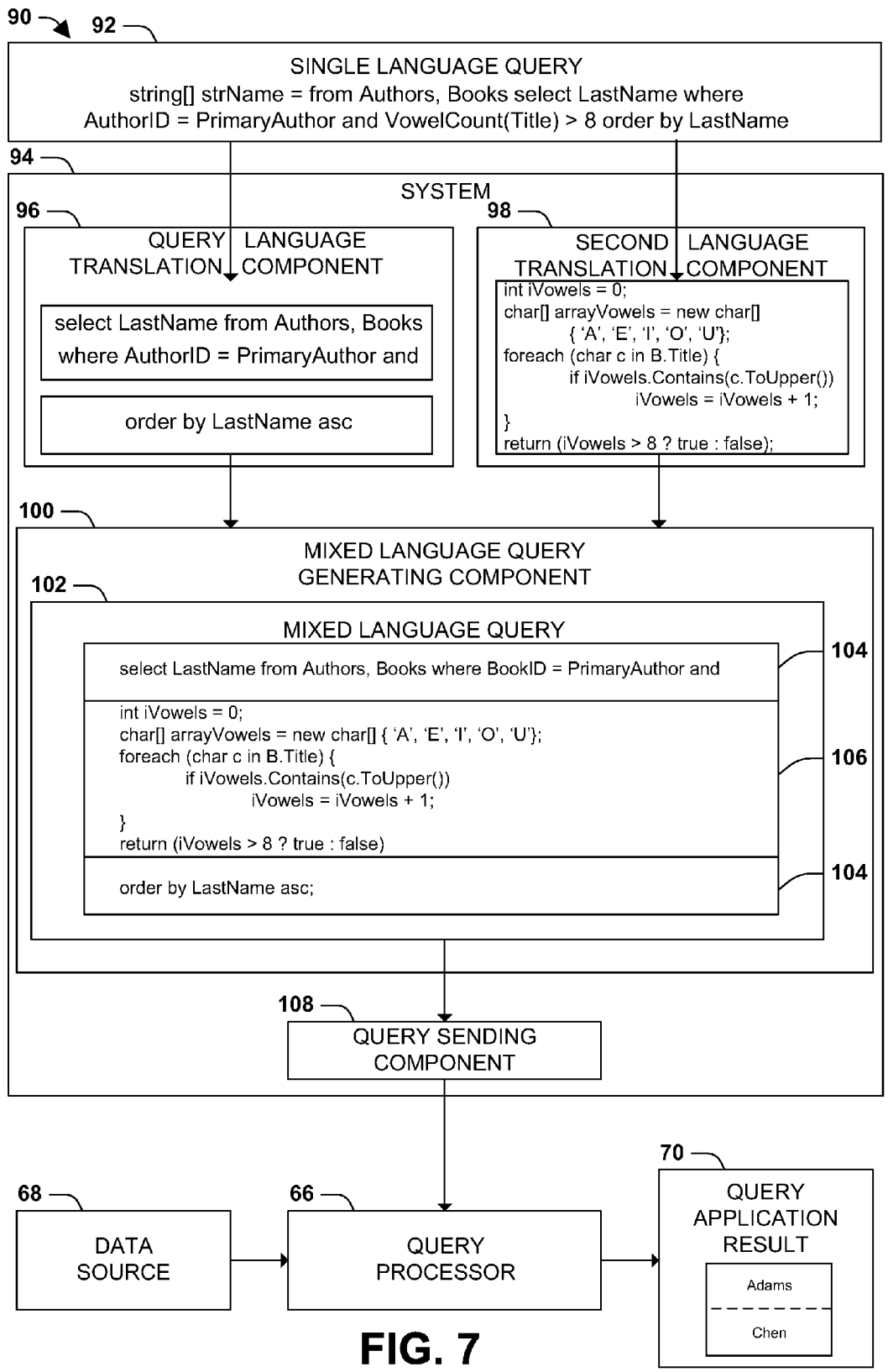
FIG. 7 is a component block diagram illustrating an exemplary system for issuing the query to a query processor configured to parse mixed language queries having components of a query language and components of a second language.

FIG. 7 illustrates an exemplary scenario 90 involving an automated translation of a single language query 90 into a mixed language query. The single language query 92 may be translated by an exemplary system 94 for issuing the query to a query processor 66 configured to parse mixed language queries having components of a query language and components of a second language (such as the exemplary query processor 58 of FIG. 5.) The exemplary system 94 comprises a query language translation component 96, which is configured to translate a first portion of the single language query 92 into a query language portion (in this case, the select clause, a first portion of the where clause, and the order clause.) The exemplary system 94 also comprises a second language translating component 98, which is configured to translate a second portion of the single language query 92 into a second language portion (in this case, the vowel-counting portion of the where clause.) The exemplary system 94 also comprises a mixed language query generation component 100, which is configured to combine the query language portion and the second language portion to generate a mixed language query 102 having a query language portion 104 and a second language portion 106. Finally, the exemplary system 94 comprises a query sending component 108 configured to send the mixed language query 102 to the query processor 66. The query processor 66 may then parse the mixed language query 102 and apply it to the data source 68, and if the evaluation generates a query application result 70, the query processor 66 may return the query application result 70 to the client. By handling the single language query 92 in this manner, the exemplary system 94 achieves the processing of the single language query through an automated translation of the query into a query language portion and a second language portion for an improved range of capabilities and efficiency.

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the exemplary method 70 of FIG. 6 and the exemplary system 94 of FIG. 7) to confer individual and/or synergistic advantages upon such embodiments.

A first aspect that may vary among embodiments relates to the types of queries processed according to these techniques. FIG. 5 illustrates one such query, which is formulated as a single language query that invokes a function of the first language. While the first language may be capable of specifying the entire query, and while a query processor that is compatible with the first language may be able to evaluate and apply the query according to the standards of the first language, it may be more efficient to specify a portion of the query (in this case, the "VowelCount" function) according to a second language (in this case, an object-oriented programming language), and to include a function in the second language that specifies this portion with improved efficiency. The mixed language query may then be processed in a more efficient manner than the single language query.

A second example of a query to which these techniques may be applied is a language-integrated query, where a conventional programming language is extended to include some syntax and supporting libraries for specifying queries. A language-integrated query differs from a non-language-integrated query, where the query is specified as a separate data construct that is handled by components of the programming language (e.g., as a text string that is simply generated and passed to the query processor), and where the syntax is not parsed and does not directly interact with other components of the first language. By contrast, the language-integrated query is specified according to the syntax of the first language, and the logical constructs of the query may be evaluated and compiled by the compiler as operations. The single language query 92 of FIG. 7 is one such language-integrated query, wherein the query syntax is specified in the first language that directly interacts with functions and objects of the object-oriented language. A compiler might translate this type of language-integrated query into a single-language query specified in a query language, e.g., SQL, and this query might then be sent to an SQL-compatible query processor; or the compiler might generate a set of instructions that comprise the logic of the query (e.g., a compiled set of object-oriented instructions, or an expression tree.) Alternatively, and in accordance with the techniques discussed herein, the compiler may generate a mixed language query 102, which may include some components translated from the first language into a query language (e.g., SQL) and other components translated into a second language. For example, a language-integrated query may be translated into a query language portion and a second language portion, which may be combined into a mixed language expression tree having a query language portion and a second language portion, and mixed language expression tree may be sent to the query processor for evaluation. Those of ordinary skill in the art may devise many types of queries to which the techniques discussed herein may be applied.

A second aspect that may exist in many variations relates to the application of the evaluated query against various data sources, i.e., to the operations to be performed on data sources while performing the logic for carrying out the evaluated query. While the techniques provided herein relate more to the generation of the query than the use of the evaluated query, some features of the application of the query to various data sources may be related to the translation techniques used to produce the mixed language query. As one example, the evaluated query may be applied to many forms of data sources, including (e.g.) relational databases comprising sets of interrelated tables, and flat databases comprising sets of data without direct relationships. The evaluated query may also be applied against spatial databases configured to contain data relating to various dimensional spaces (e.g., 2D, 3D, and 4D spaces, with Euclidean, polar, or spherical coordinate systems, and where the data include points, areas and volumes, geometric shapes, etc.) The evaluated query may also be applied against hierarchical databases, comprising data items having various parent/child relationship with respect to other data items; network databases, comprising graphs of data items with various types of interrelationships; object-oriented databases, comprising data items representing objects of various classes; etc.

In view of the various data sources against which an evaluated query may be applied, the languages through which the query is translated and evaluated according to these techniques may be advantageously chosen with respect to the nature of the targeted data source. For example, a natural language query may be translated into a mixed query having an object-oriented component if the targeted data source comprises an object-oriented database; this language selection may yield an evaluated query logic that is more directly applicable to the data source than may be achieved by other languages. As another example, if the application of the evaluated query against a data source produces a query application result (e.g., a set of records matching the query), it may be advantageous to format the query application result as at least one data object of at least one data type formatted according to at least one of the first language and the second language. For instance, if the query is originally of an object-oriented language, then the results of the query may be formatted as one or more objects of one or more well-defined classes. Similarly, a query provided (in whole or in part) of a declarative language, such as XQuery, may indicate that the query application result should be formatted in a similarly declarative manner, such as in XML. Many such aspects of the translation and evaluation of the query may be advantageously used during the application of the evaluated query against a data source (and vice versa) while implementing the techniques discussed herein.

The data sources against which the evaluated query may be applied may also be devised according to various architectures. As one example, a query evaluation component may be provided on the system hosting the data source against which the evaluated mixed language queries are to be applied. As a second example, the query evaluation component may be provided on a first system, such as a first data server, and the evaluated query may be applied against a data source hosted by a second system, such as a second data server. This architecture may be advantageous where a business logic for using the data in the data source is isolated from the database management system, which may be a popular scenario for promoting data integrity.

As a third example, a mixed language query may be applied against a plurality of data sources, where a first portion of the query applies to a first data source and a second portion of the query applies to a second data source, etc. For instance, a query may tie together information contained in tables that are related but that exist in different data sources. Such data sources might comprise databases of different types, e.g., a relational database specifying objects stored in an object-oriented database hosted on the same data server, or a different data server. This example might be particularly advantageous for the utilization of these techniques, wherein a first portion of a query targeting a first data source may be of a first language that is suitable for the first data source (e.g., an object-oriented language query portion targeting an object-oriented database), and a second portion of the query targeting a second data source may be of a second language that is suitable for the second data source (e.g., an SQL query targeting a relational database.) Thus, the first language query portion may pertain to a first data source hosted by the first data server, and the second language query portion may pertain to a second data source hosted by the second data server. Additionally, this configuration may be advantageous where the first language query portion is handled by a first language query evaluation component hosted by the first data server, and the second language query portion is handled by a second language query evaluation component hosted by the second data server. In this scenario, the mixed language query contains portions in different languages that happen to target different data sources and are processed by query evaluation components on the different data sources, which may provide a performance improvement through computing parallelization. Many other variations in the architectures of the various data source systems may be devised by those of ordinary skill in the art while implementing the techniques discussed herein.

A third aspect that may vary among embodiments of these techniques relates to the translating of the first language query into a mixed language query, which may be performed in many ways. As a first example, the translating may involve generating an expression tree that may be sent to the query processor for evaluation. Alternatively, the translating may involve generating a human-readable data structure, such as a text string, that encompasses both the query language portion and the second language portion (e.g., the text string comprising the mixed language query 102 in FIG. 7.) As another alternative, if one or more portions of the query may be specified in a partially or wholly compiled form, then the techniques may include the partial or whole compiling of such portions, and the mixed language query submitted to the query processor may include an at least partially compiled portion. For example, the object-oriented code comprising the second language portion 106 in the mixed language query 100 of FIG. 7 may be partially or wholly compiled, and the query submitted to the query processor 66 may include a set of intermediate language instructions or a set of compiled machine instructions that may be invoked to perform the vowel-counting filtering of the query. As a second example of this third aspect, the query may be adjusted such that one portion specified in one language is configured to be compatible with another portion specified in another language. For example, if the query language operates on numbers of a certain format (e.g., floating-point numbers of a fixed significance), the object-oriented portion may be adjusted to include instructions for formatting numbers in the floating-point representation for easier operation by the query language portions. As a third example of this third aspect, the mixed language query may be further refined by including (in addition to the query language portion and the second language portion) a third portion specified in a third language, in case this portion of the query is advantageously specified in the third language with comparison to equivalent specifications in the query language or the second language. Those of ordinary skill in the art may devise many techniques for translating single language queries into mixed language queries in accordance with the techniques discussed herein.

A fourth aspect that may vary among implementations relates to the handling of the mixed language query to achieve further advantages. As a first example, the single language query may reference one or more objects involved in the query and specified according to the first language. For example, a data store of objects may be queried to determine if an object of the first language is already present in the data store, and the query may involve comparing the object of interest (or some of its properties, e.g., its GUID or hashcode) to each object in the data store. In this scenario, the techniques may involve translating the at least one object into the query language and/or the second language, depending on the portion in which it is referenced. For example, when the object is serialized for delivery to the query processor (e.g., over a network or data bus), the serialization may be performed to convert the object of the first language into an object representation of the query language and/or the second language. As a second example of this fourth aspect, if the application of the query against the data source results in a query result set, the techniques may include reformatting the query result set to a format according to the first language in which the query was originally written. For example, the query result set may be packaged into an object representation of the first language (e.g., an appropriately formatted scalar value, a list of strings corresponding to an array of text-based output, or a data structure representing a row in a returned table.) It may be advantageous to generate at least one local object of the first language corresponding to each element of the query result set, such as a particular record. Alternatively, at least one element of the query result set may be stored in at least one local object of the first language, e.g., in a data binding scenario where a returned query result is automatically stored in a particular field of an object. Those of ordinary skill in the art may devise many techniques for interactively operating on the mixed language query (and associated data) while implementing the techniques discussed herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 8:
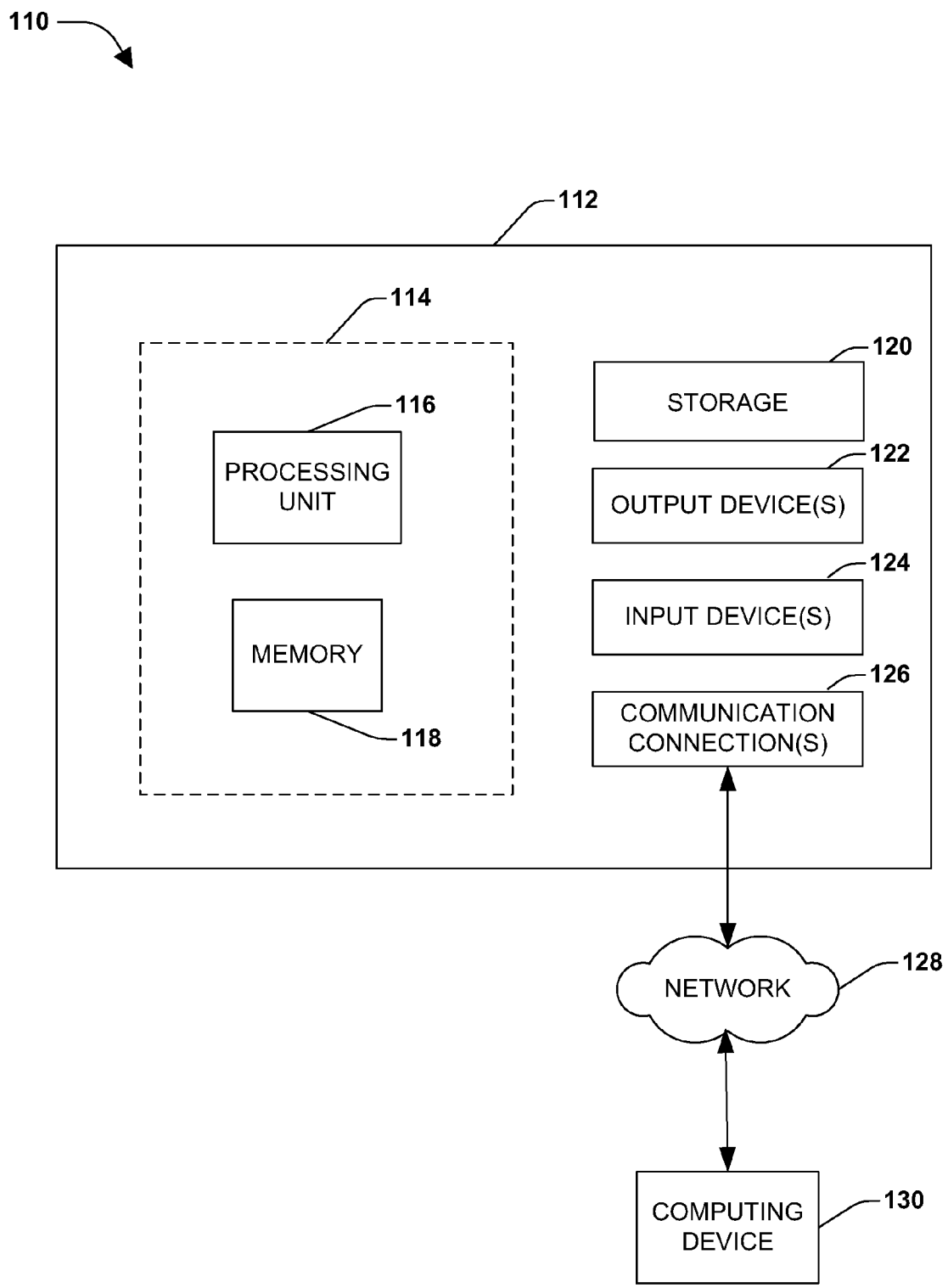
FIG. 8 is an illustration of an exemplary computing environment wherein one or more of the provisions set forth herein may be implemented.

FIG. 8 and the following discussion provide a brief, general description of a suitable computing environment to implement embodiments of one or more of the provisions set forth herein. The operating environment of FIG. 8 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 8 illustrates an example of a system 110 comprising a computing device 112 configured to implement one or more embodiments provided herein. In one configuration, computing device 112 includes at least one processing unit 116 and memory 118. Depending on the exact configuration and type of computing device, memory 118 may be volatile (such as RAM, for example), non-volatile (such as ROM, flash memory, etc., for example) or some combination of the two. This configuration is illustrated in FIG. 8 by dashed line 114.

In other embodiments, device 112 may include additional features and/or functionality. For example, device 112 may also include additional storage (e.g., removable and/or non-removable) including, but not limited to, magnetic storage, optical storage, and the like. Such additional storage is illustrated in FIG. 8 by storage 120. In one embodiment, computer readable instructions to implement one or more embodiments provided herein may be in storage 120. Storage 120 may also store other computer readable instructions to implement an operating system, an application program, and the like. Computer readable instructions may be loaded in memory 118 for execution by processing unit 116, for example.

The term "computer readable media" as used herein includes computer storage media. Computer storage media includes volatile and nonvolatile, removable and non-removable media implemented in any method or technology for storage of information such as computer readable instructions or other data. Memory 118 and storage 120 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 112. Any such computer storage media may be part of device 112.

Device 112 may also include communication connection(s) 126 that allows device 112 to communicate with other devices. Communication connection(s) 126 may include, but is not limited to, a modem, a Network Interface Card (NIC), an integrated network interface, a radio frequency transmitter/receiver, an infrared port, a USB connection, or other interfaces for connecting computing device 112 to other computing devices. Communication connection(s) 126 may include a wired connection or a wireless connection. Communication connection(s) 126 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 112 may include input device(s) 124 such as keyboard, mouse, pen, voice input device, touch input device, infrared cameras, video input devices, and/or any other input device. Output device(s) 122 such as one or more displays, speakers, printers, and/or any other output device may also be included in device 112. Input device(s) 124 and output device(s) 122 may be connected to device 112 via a wired connection, wireless connection, or any combination thereof. In one embodiment, an input device or an output device from another computing device may be used as input device(s) 124 or output device(s) 122 for computing device 112.

Components of computing device 112 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 112 may be interconnected by a network. For example, memory 118 may be comprised of multiple physical memory units located in different physical locations interconnected by a network.

Those skilled in the art will realize that storage devices utilized to store computer readable instructions may be distributed across a network. For example, a computing device 130 accessible via network 128 may store computer readable instructions to implement one or more embodiments provided herein. Computing device 112 may access computing device 130 and download a part or all of the computer readable instructions for execution. Alternatively, computing device 112 may download pieces of the computer readable instructions, as needed, or some instructions may be executed at computing device 112 and some at computing device 130.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of issuing, from a device having a processor, a query specified in a first language to a query processor configured to parse mixed language queries having query components specified in the first language and query components of specified in a second language that is different from the first language, the method comprising:

executing on the processor instructions configured to:
translate a translation portion of the query into a second language portion specified in the second language;

combine a remainder portion of the query excluding the translation portion and the second language portion to generate a mixed language query; and send the mixed language query to the query processor.

2. The method of claim 1, comprising: translating the remainder portion of the query into a query language portion specified according to a query language that is different from the first language and the second language.

3. The method of claim 2, at least one of the second language portion and the query language portion configured to generate a processed query portion that is compatible with the other of the second language portion and the query language portion.

4. The method of claim 1, comprising:

translating a third portion of the query into a third language portion specified in a third language that is different from the first language and the second language, and the combining comprising: combining the remainder portion, the second language portion, and the third language portion to generate the mixed language query.

5. The method of claim 1:

the combining comprising: generating a mixed language expression tree comprising the remainder portion and the second language portion; and the sending comprising: sending the mixed language expression tree to the query processor.

6. The method of claim 1:

the query processor comprising a second language runtime configured to process at least partially compiled components of the second language, and the method comprising: at least partially compiling the second language portion into an at least partially compiled second language component.

7. The method of claim 1:

the query specifying at least one object in the first language, and the method comprising: translating the at least one object into the second language.

8. The method of claim 1, comprising: upon receiving a query result from the query processor for the mixed language query, translating the query result into the first language.

9. The method of claim 8, translating to the first language comprising:

generating at least one local object of the first language comprising at least one element of the query result.

10. The method of claim 9, respective local objects corresponding to a record in the query result.

11. The method of claim 8, translating to the first language comprising: storing at least one element of the query result in at least one local object of the first language.

12. The method of claim 1:

the query processor comprising a first query processor configured to process query components specified in the first language and a second query processor configured to process query components specified in the second language;

the remainder portion of the mixed language query targeted to the first query processor and the second portion of the mixed language query targeted to the second query processor; and the sending comprising:

sending the query language portion of the mixed language query to the first query processor, and sending the second language portion of the mixed language query to the second query processor.

13. A system for issuing a query specified in a first language to a query processor configured to parse mixed language queries having query components of a query language and components of a second language that is different from the first language on a device having a memory and a processor, the system comprising:

a second language translating component comprising instructions stored in the memory that, when executed on the processor, cause the device to translate a translation portion of the query into a second language portion specified in the second language;

a mixed language query generating component comprising instructions stored in the memory that, when executed on the processor, cause the device to combine a remainder portion of the query excluding the translation portion and the second language portion to generate a mixed language query; and a query sending component comprising instructions stored in the memory that, when executed on the processor, cause the device to send the mixed language query to the query processor.

14. The system of claim 13:

the mixed language query generating component configured to generate a mixed language expression tree comprising the remainder portion and the second language portion; and the query sending component configured to send the mixed language expression tree to the query processor.

15. The system of claim 13:

the query processor comprising a second language runtime configured to process at least partially compiled components of the second language, and the system comprising: a second language compiling component configured to at least partially compile the second language portion into an at least partially compiled second language component.

16. The system of claim 13:

the query specifying at least one object in the first language, and the system comprising: an object translating component configured to translate the at least one object into the second language.

17. The system of claim 13, comprising: a query result receiving component configured to translate into the first language a query result received from the query processor for the mixed language query.

18. The system of claim 17, comprising:

a local object generating component configured to generate at least one local object comprising at least one element of the query result.

19. The system of claim 17, the query result receiving component configured to store at least one element of the query result in at least one local object of the first language.

20. A memory device storing instructions that, when executed on a processor of a computer, cause the computer to issue a query specified in a first language to a query processor configured to parse mixed language queries having query components specified in the first language and query components specified in a second language that is different from the first language, by:

translating a translation portion of the query into a second language portion specified in the second language;

combining a remainder portion of the query excluding the translation portion and the second language portion to generate a mixed language query; and send the mixed language query to the query processor.

* * * * *